United States Patent
Hasegawa (10) Patent No.: US 8,115,970 B2
(45) Date of Patent: Feb. 14, 2012

(54) IMAGE READING DEVICE, IMAGE FORMING APPARATUS, AND IMAGE READING METHOD

(75) Inventor: Ryu Hasegawa, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 448 days.

(21) Appl. No.: 12/365,529

(22) Filed: Feb. 4, 2009

(65) Prior Publication Data

US 2009/0201519 A1 Aug. 13, 2009

(30) Foreign Application Priority Data

Feb. 13, 2008 (JP) ................................. 2008-032213

(51) Int. Cl.
*H04N 1/40* (2006.01)

(52) U.S. Cl. ............................ 358/461; 358/406; 358/474

(58) Field of Classification Search .................... 358/461
See application file for complete search history.

(56) References Cited

U.S. PATENT DOCUMENTS

| 5,970,181 A * | 10/1999 | Ohtsu | 382/274 |
| 6,771,397 B2 * | 8/2004 | Hashizume | 358/474 |
| 6,922,263 B2 * | 7/2005 | Sone | 358/461 |
| 7,681,981 B2 * | 3/2010 | Hoshi | 347/22 |
| 7,782,502 B2 * | 8/2010 | Shiraishi et al. | 358/474 |
| 2005/0157351 A1 * | 7/2005 | Matsuda | 358/474 |
| 2006/0193013 A1 * | 8/2006 | Hoshi | 358/474 |
| 2008/0055676 A1 * | 3/2008 | Sugeta et al. | 358/498 |

FOREIGN PATENT DOCUMENTS

| JP | 2001-053938 A | 2/2001 |
| JP | 2001-223895 A | 8/2001 |
| JP | 2005-167854 | 6/2005 |

* cited by examiner

*Primary Examiner* — Twyler Haskins
*Assistant Examiner* — Helen Q Zong
(74) *Attorney, Agent, or Firm* — Dickstein Shapiro LLP (57) ABSTRACT

An image forming apparatus includes an image reading device which reads an image in accordance with a sheet-through method. The image reading device includes a reading device and a control device. The reading device is configured to include a carriage including an optical device for optically reading an image. The control device is configured to control shading correction of images on successively fed sheets by first performing the setting of the timing of starting a shading correction and the setting of the operation of the carriage, and then performing the setting of shading correction before shading correction starts during the operation of the carriage.

11 Claims, 11 Drawing Sheets

IMAGE READING DEVICE, IMAGE
FORMING APPARATUS, AND IMAGE
READING METHOD

CROSS-REFERENCE TO RELATED
APPLICATION

This application claims priority to Japanese Patent Application No. 2008-032213 filed on Feb. 13, 2008, the entire contents of which are hereby incorporated by reference herein.

BACKGROUND OF THE INVENTION

1. Field of the Invention

The present invention relates to an image reading device that employs a shading correction technique in an image reading operation, in particular shading correction performed in an image reading operation according to a sheet-through method, an image forming apparatus including the image reading device; and an image reading method of reading an image using the sheet-through method.

2. Discussion of the Background Art

In general, image reading devices are divided into two types: a flat-bed type and a sheet-through type. In the flat-bed type image reading device, an exposure scanning unit scans an original copy (hereinafter referred to as the document) placed on a contact glass to read the image of the document. In the sheet-through type image reading device, an exposure scanning unit of a scanner section is fixed. Thus, the sheet-through type image reading device moves a document to read the image of the document. In particular, the sheet-through type image reading device is capable of reading successive images, and therefore productivity can be improved if the number of documents read per unit of time is increased.

In the operation of reading the document image, a type of correction called shading correction is commonly performed. Shading correction corrects changes in the amount of light used to read the document image caused by variation in the main scanning direction of the illuminance provided by an exposure lamp serving as a light source used to read the document image together with a light-receiving element or by the passage of light-up time. In shading correction, a white reference plate which provides a white density reference value is read in each document reading operation, and the image output is corrected on the basis of the thus-read data.

When an image reading device capable of reading an image using either the flat-bed method or the sheet-through method performs the document reading operation using the sheet-through method, it is desirable to equalize the amount of correction carried out on image output read using the sheet-through method with the amount of correction performed on the image output read in the flat-bed method. Therefore, the image reading device moves a carriage of the exposure scanning unit to the white reference plate to perform shading correction, and thereafter moves the carriage back to a reading position to perform the document reading operation.

As described above, shading correction performed by the sheet-through type image reading device involves the process of moving the exposure scanning unit to the white reference plate and thereafter moving the exposure scanning unit back to the reading position. Consequently, the image reading device is prevented from starting the reading operation of the next document until the current shading correction is completed. As a result, in the reading of successive images, a time interval between the reading of one document and the reading of the next document is naturally longer than the time of shading correction performed in a DF (Document Feed) mode. (Hereinafter, the term "DF mode" is used interchangeably with the term "ADF (Automatic Document Feed) mode". Further, document feeding in the DF mode will be hereinafter referred to as DF.)

Accordingly, to improve image reading productivity of the sheet-through type image reading device described above, it is desirable to reduce the time interval between the reading of one document and the reading of the next document. It is therefore desirable to reduce the time interval between successive document feeds, and to reduce the time of the above-described shading correction performed during document reading.

In light of the above-described circumstances, a known image reading device has been proposed which is capable of reading an image using either a book-read (i.e., flat-bed) method of causing an exposure scanning unit to scan a fixed document to read the image of the document or the sheet-through method of moving a document with respect to an exposure scanning unit of a scanner to read the image of the document. The known image reading device is configured to perform a successive document reading operation if a time TD is longer than a time Ts, wherein the time TD represents the time from the start of a non-stop sheet-through feeding operation by an automatic document feeder to the arrival of a leading end of a document to the reading position, and the time Ts represents the time required to perform shading correction in the DF mode in which a document is automatically fed and read.

Figure 1:
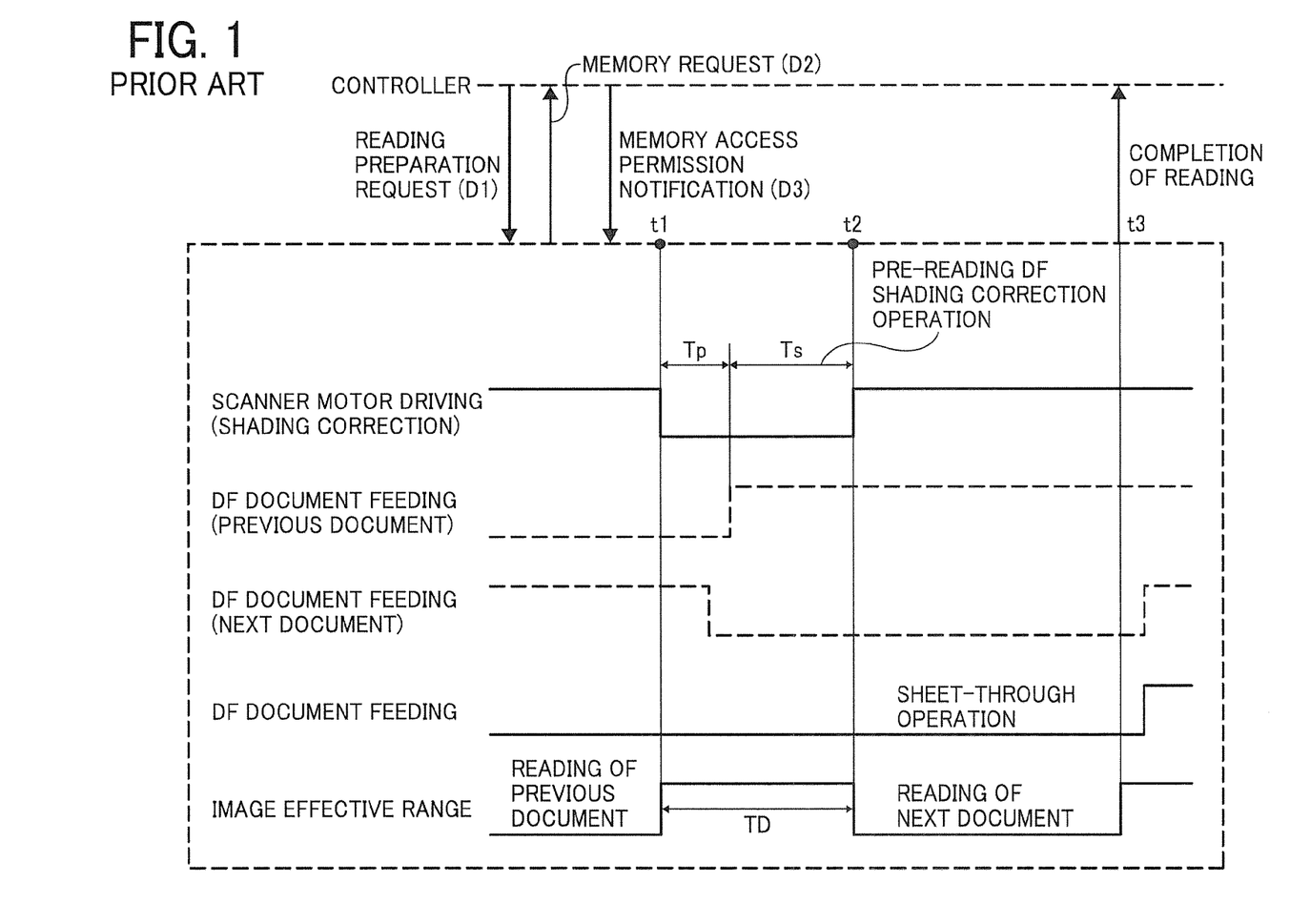
FIG. 1 is a timing chart illustrating operation Liming of an image reading operation in a successive sheet feeding operation according to a background technique.

As illustrated in the timing chart shown in FIG. 1, for example, in shading correction performed during the non-stop DF operation in accordance with the known technique described above, an instruction to perform a carriage operation is issued after the setting of a carriage driving operation and the setting of a reading operation for shading correction are performed after a time point t1 at which the reading operation of a previous document is completed. That is, the image reading device receives a reading preparation request from a controller (D1), sends a memory request to the controller (D2), and receives a memory access permission notification from the controller (D3). Thereafter, at the time point t1 at which the reading operation of the previous document is completed, the image reading device starts a pre-reading DF shading correction. Then, at a time point t2 at which the pre-reading DF shading correction is completed, the image reading device starts the reading operation of the next document. Further, at a time point t3 at which the next document is moved outside an image effective range, the image reading device completes the reading operation. According to the timing illustrated in FIG. 1, the sheet feeding operation of the next document starts after the completion of the reading operation of the previous document and before the completion of the sheet feeding operation of the previous document in the DF reading operation. Further, the DF document feeding operation is completed when the sheet feeding operation of the next document is completed.

According to the above-described timing, the time TD between the previous document and the next document in the non-stop successive sheet feeding operation corresponds to the sum of a processing time Ts of the DF shading correction and a preparation time Tp for the DF shading correction, and represents a pre-reading DF shading correction time. The time TD is represented as the following equation:

$$TD = Tp + Ts \quad (1)$$

The time TD is also represented as the following equation:

$$TD = t2 - t1 \quad (2)$$

It is to be noted that productivity is determined by the processing time, that is, the shorter the processing time the greater the productivity. However, the way in which known apparatuses including that described above operate makes it difficult to reduce the processing time and improve the productivity, for reasons which are discussed in greater detail below.

Figure 2:
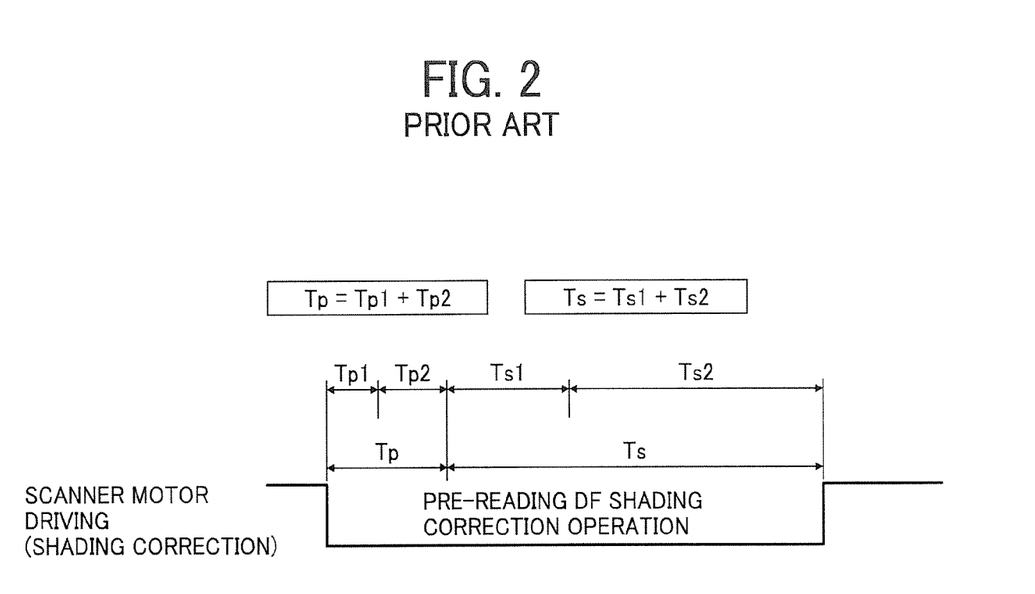
FIG. 2 is a diagram illustrating details of the processing time of shading correction in FIG. 1.

FIG. 2 is a detailed timing chart illustrating the above-described time TD. As can be observed from the drawing, the preparation time Tp for the DF shading correction corresponds to the sum of a preparation time Tp1 for the reading operation for shading correction and a preparation time Tp2 for the setting of the carriage driving operation. That is, the preparation time Tp is represented as the following equation:

$$Tp=Tp1+Tp2 \quad (3)$$

Further, the processing time Ts of the DF shading correction corresponds to the sum of a time Ts1 from the start of the carriage movement to the start of the reading operation for shading correction and a time Ts2 from the start of the reading operation for shading correction to the completion of shading correction. That is, the processing time Ts is represented as the following equation:

$$Ts=Ts1+Ts2 \quad (4)$$

Figure 3:
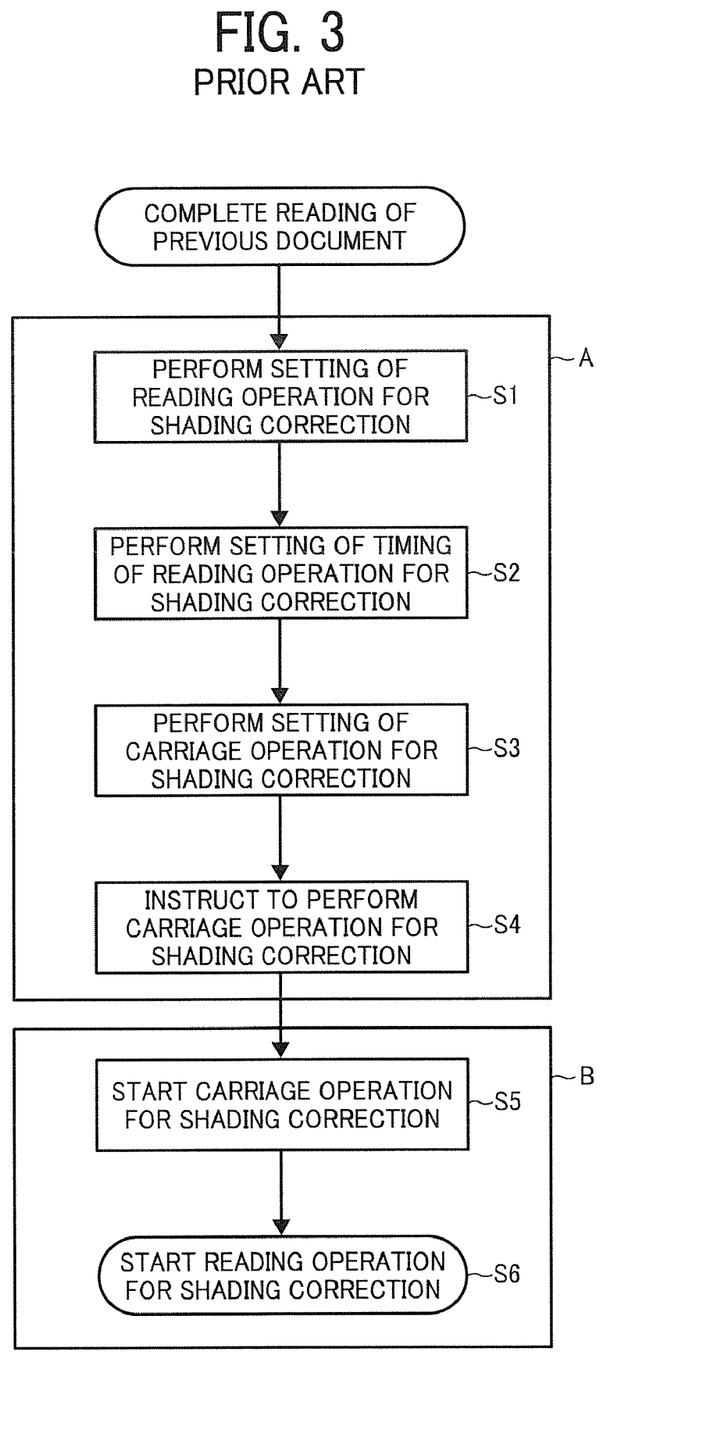
FIG. 3 is a flowchart illustrating a processing procedure performed in shading correction in the successive sheet feeding operation according to the background technique.

FIG. 3 is a flowchart illustrating a processing procedure of the processing performed in accordance with the timing illustrated in FIGS. 1 and 2. The processing procedure is divided into a shading correction setting process A including Steps S1 to S4 and a shading correction B including Steps S5 and S6. According to the processing procedure, upon completion of the reading operation of the previous document, the setting of the reading operation for shading correction (Step S1) and the setting of the timing of the reading operation for shading correction (Step S2) are performed. Then, the setting of the carriage operation for shading correction (Step S3) is performed. Thereafter, an instruction to perform the carriage operation for shading correction is issued (Step S4).

On the basis of the above-described operation instruction, the carriage operation for shading correction is started (Step S5), and the reading operation for shading correction is started (Step S6). Thereby, the reading operation for shading correction is performed. The timing of starting Step S1 corresponds to the time point t1, and the timing of completing Step S6 corresponds to the time point t2.

Thus, according to known techniques including the technique described above, in the non-stop automatic document feeding operation in the DF mode, i.e., in the successive document reading operation, the operation is performed in the order of the notification of the memory access permission (represented as D3 in FIG. 1), shading correction in the time TD, and the sheet-through reading operation. More precisely, shading correction included in the above-described operation is performed in the order of the setting of shading correction in the preparation time Tp, the carriage operation in the time Ts1, and shading correction in the time Ts2.

The processing time taken to perform shading correction in the above-described manner corresponds to the sum of the time for shading correction setting process A and the time for shading correction B. In the successive document reading operation in the DF mode, therefore, it is difficult to make the time interval between two successive documents shorter than the processing time corresponding to the sum of the times described above. Therefore, it is difficult to reduce the processing time and improve the productivity.

SUMMARY OF THE INVENTION

This patent specification describes an image forming apparatus. In one example, an image forming apparatus includes an image reading device which reads an image in accordance with a sheet-through method. The image reading device includes a reading device and a control device. The reading device is configured to include a carriage including an optical device for optically reading an image. The control device is configured to control shading correction of images on successively fed sheets by first performing the setting of the timing of starting a shading correction and the setting of the operation of the carriage, and then performing the setting of shading correction before shading correction starts during the operation of the carriage.

This patent specification further describes an image reading device. In one example, an image reading device reads an image in accordance with a sheet-through method, and includes a reading device and a control device. The reading device is configured to include a carriage including an optical device for optically reading an image. The control device is configured to control shading correction of images on successively fed sheets by first performing the setting of the timing of starting a shading correction and the setting of the operation of the carriage, and then performing the setting of shading correction before shading correction starts during the operation of the carriage.

This patent specification further describes an image reading method. In one example, an image reading method reads an image in accordance with a sheet-through method, and includes optically reading an image by operating a carriage including an optical device, and performing shading correction of images on successively fed sheets. The performing shading correction includes performing the setting of the timing of starting a shading correction, performing the setting of the operation of the carriage, performing the setting of shading correction, and performing shading correction during the operation of the carriage.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION OF THE INVENTION

In describing the embodiments illustrated in the drawings, specific terminology is employed for the purpose of clarity. However, the disclosure of this patent specification is not intended to be limited to the specific terminology so used, and it is to be understood that substitutions for each specific element can include any technical equivalents that operate in a similar manner.

Referring now to the drawings, wherein like reference numerals designate identical or corresponding parts throughout the several views, embodiments of the present invention will be described. In the following, description of overlapping parts will be omitted.

Figure 4:
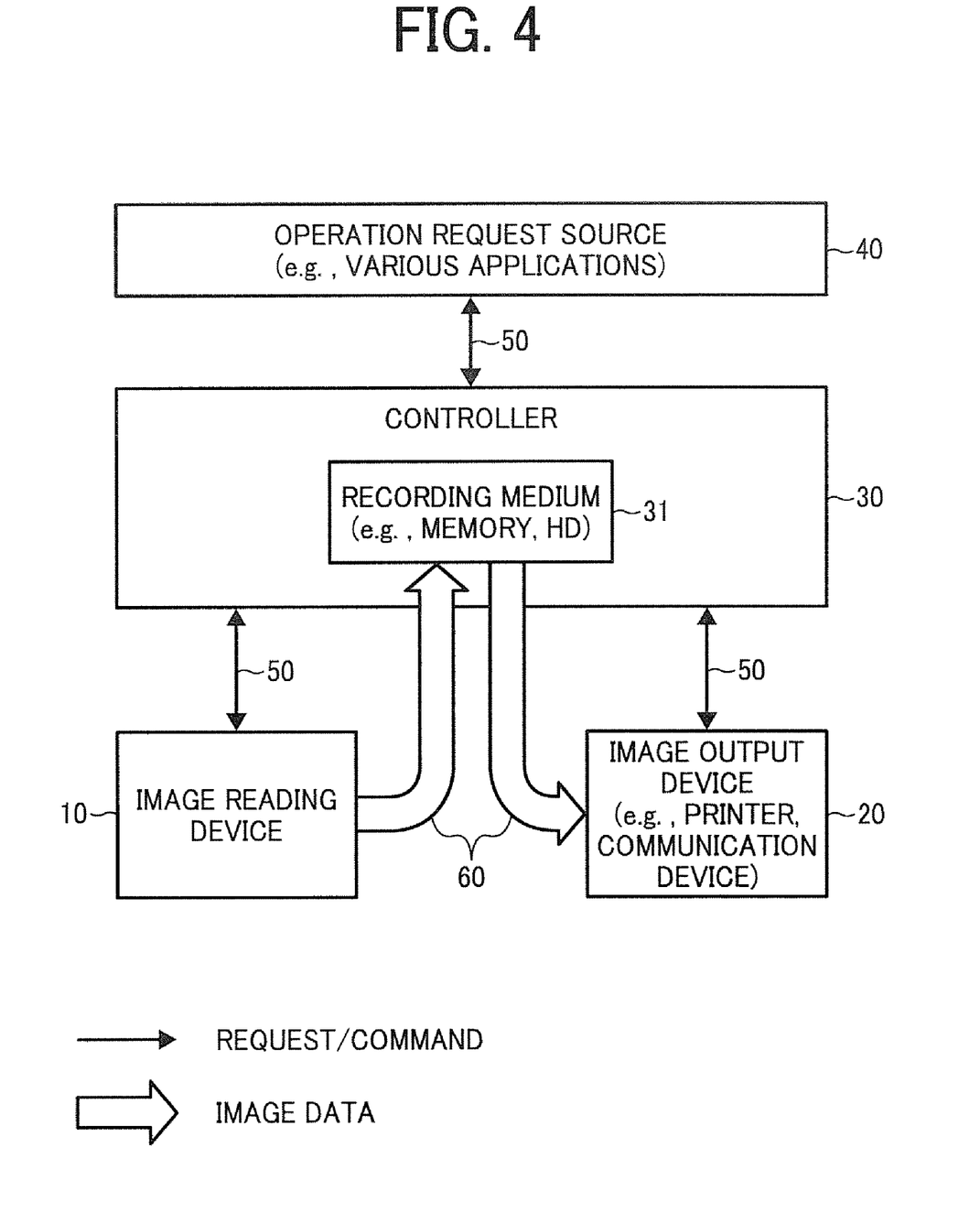
FIG. 4 is a diagram illustrating a schematic configuration of a system including an image reading device according to an embodiment of the present invention.

FIG. 4 is a diagram illustrating a schematic configuration of a system including an image reading device according to an embodiment of the present invention. In FIG. 4, the system according to the present embodiment includes devices such as an image reading device 10 and an image output device 20, a controller 30, and an operation request source (e.g., a variety of applications) 40. In this example, the operation request source 40 issues an operation request to the controller 30. Upon receipt of the operation request, the controller 30 issues an operation request to the respective devices and manages the devices. Upon receipt of the operation request, the devices perform actual operations. In this case, the controller 30 includes an image recording device (i.e., a recording medium) 31 for storing an image, such as a memory and a hard disk (HD), and a not illustrated image recording control unit for controlling the image recording device. As described above, the devices include the image reading device 10 and the image output device 20 which includes a printer, a communication device, and so forth. In FIG. 4, solid arrows represent commands 50, and white arrows represent flows of image data 60.

In the above-described system configuration, upon pressing on a reading start button of a not illustrated operation unit of the image output device 20 such as a copier, for example, the operation request source 40 sends an image reading request to the controller 30. Upon receipt of the request, the controller 30 instructs the image reading device 10 to perform preparations for an image reading operation, such as register setting and an arithmetic operation for performing the requested image reading operation. At the same time, the controller 30 sends the image recording control unit a request to prepare the memory, the hard disk, or the like for storing image data to be read. In response to the instruction and the request, respectively, the image reading device 10 and the image recording device 31 notify the controller 30 of the completion of the preparations when the image reading device 10 and the image recording device 31 are respectively ready to start the image reading operation. Upon completion of the preparations by the image reading device 10 and the image recording device 31, the controller 30 issues a reading start request to the image reading device 10. Upon receipt of the reading start request, the image reading device 10 performs an actual image reading operation, and transmits the read data to the image recording device 31. After the completion of the data transmission, the controller 30 issues, as necessary, an output request to the image output device 20. Upon receipt of the output request from the controller 30, the image output device 20 outputs the image data stored in the image recording device 31 onto a recording medium (e.g., a sheet).

Figure 5:
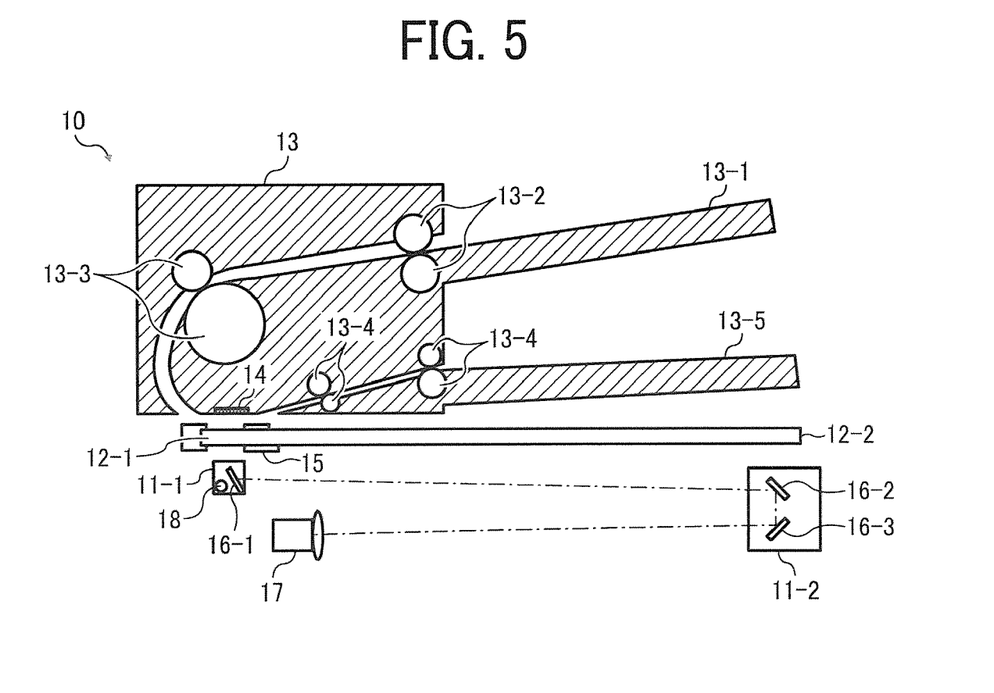
FIG. 5 is a diagram illustrating a schematic configuration of the image reading device forming a part of the system configuration illustrated in FIG. 4.
Figure 6:
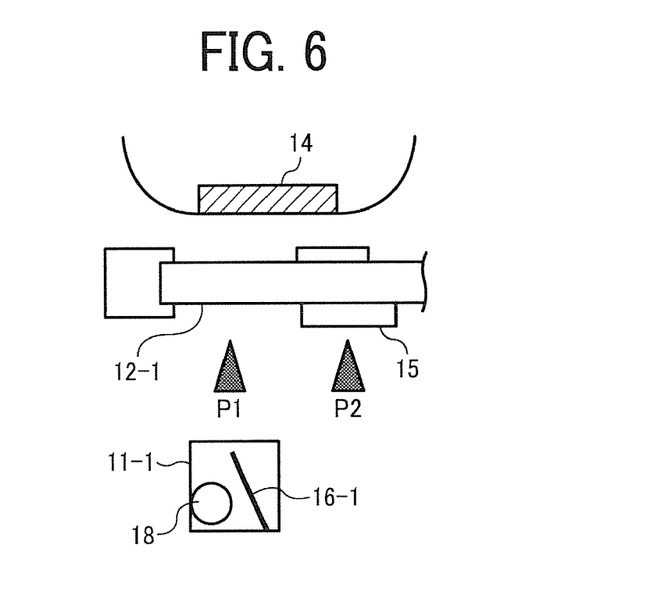
FIG. 6 is an enlarged view of a part of the image reading device illustrated in FIG. 5 near a white reference plate.

FIG. 5 is a schematic configuration diagram of the image reading device 10 forming a part of the above-described system configuration. FIG. 6 is an enlarged view of a portion of the image reading device 10 near a white reference plate.

FIG. 5 illustrates a first carriage 11-1, a second carriage 11-2, a sheet-through contact glass 12-1, a book-read contact glass (i.e., a document table glass) 12-2, an automatic document feeder 13, a dust detection gauge 14, a white reference plate 15, a first mirror 16-1, a second mirror 16-2, a third mirror 16-3, a CCD (Charge Coupled Device) 17 functioning as an image pickup device, and a lamp 18 functioning as a light source. The automatic document feeder 13 includes a document table 13-1, sheet feeding rollers 13-2, guiding rollers 13-3, sheet discharging rollers 13-4, and a document collection table 13-5. FIG. 6 further illustrates a sheet-through reading position P1 and a white reference plate reading position P2.

The image reading device 10 illustrated in FIG. 5 can perform a document reading operation either in a sheet-through mode or in a book-read mode. In the sheet-through mode, the first carriage 11-1 for reading an image is fixed to the sheet-through reading position P1 corresponding to the sheet-through contact glass 12-1, and a document placed on the document table 13-1 is passed through the sheet-through reading position P1 to be read. In the book-read mode, the first carriage 11-1 moves at a constant speed under a stationary document placed on the book-read contact glass 12-2 to read the document. In the sheet-through mode, the document placed on the document table 13-1 is passed through the upper surface of the sheet-through contact glass 12-1, which is located directly under the dust detection gauge 14 and corresponds to the sheet-through reading position P1, by the sheet feeding rollers 13-2 and the guiding rollers 13-3 of the automatic document feeder 13. Then, the document is discharged onto the document collection table 13-5 by the sheet discharging rollers 13-4.

In the present embodiment, the term book-read mode is employed. Herein, the book-read mode refers to a mode in which a document, In particular a thick document such as a book document, is read in a flat-bed type reading method. Thus, book-read type and the flat-bed type are technically equivalents. The sheet-through contact glass 12-1 and the book-read contact glass 12-2, which are separately provided in the example of FIG. 5, may alternatively be formed of the same glass and differentiated from each other depending on the position thereof, as illustrated in FIG. 6.

In the book-read mode, when the first carriage 11-1 reaches the white reference plate reading position P2 while moving under the book-read contact glass 12-2, the first carriage 11-1 reads the white reference plate 15 to perform shading correction. In this example, even during the movement of the first carriage 11-1, the read image is input to the CCD 17 via the first to third mirrors 16-1 to 16-3. The first carriage 11-1 includes the lamp 18 and the first mirror 16-1, while the second carriage 11-2 includes the second and third mirrors 16-2 and 16-3. In the book-read mode, the first carriage 11-1 and the second carriage 11-2 perform the scanning operation such that the second carriage 11-2 moves at a speed half the speed of the first carriage 11-1, and thus that the length of the light path extending from a surface of the document to the CCD 17 is unchanged.

In the sheet-through mode, prior to the passage of the document through the sheet-through reading position P1, the first carriage 11-1 is moved to the white reference plate reading position P2 under the white reference plate 15, and reads the white reference plate 15 to perform shading correction. The first carriage 11-1 thus moved to the position under the white reference plate 15 is then moved back to the sheet-through reading position P1. The above-described sequence of operations by the first carriage 11-1 will be hereinafter referred to as the DF (Document Feeding) shading correction. Thereafter, the document is passed through the upper surface of the sheet-through contact glass 12-1 to be read. This operation will be hereinafter referred to as the sheet-through operation.

Shading correction is thus performed with the use of the same white reference plate 15 both in the book-read mode and in the sheet-through mode. Therefore, a difference in image quality is not caused between the image reading in the book-read mode and the image reading in the sheet-through mode.

Figure 7:
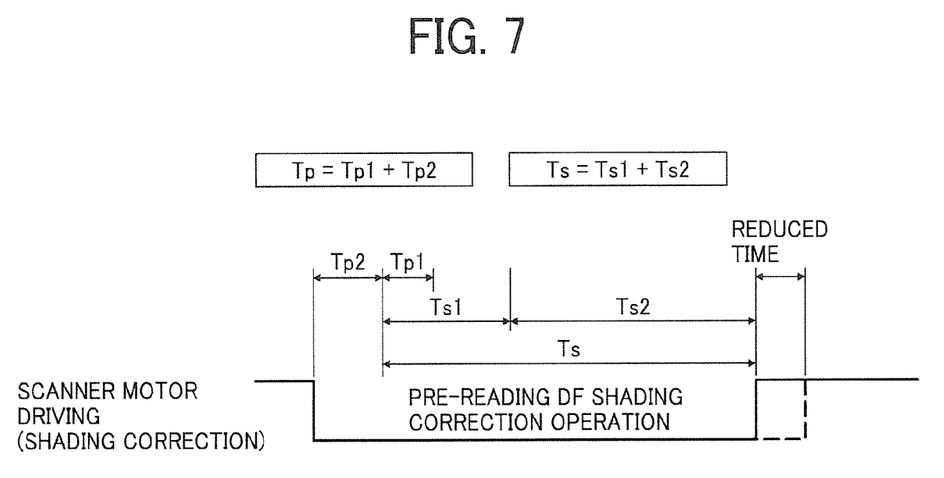
FIG. 7 is a timing chart illustrating timing of a pre-reading DF shading correction according to the present embodiment.

FIG. 7 is a timing chart illustrating timing of the pre-reading DF shading correction according to the present embodiment. Similarly to the background example previously described, the foregoing equations (1), (3), and (4), i.e., TD=Tp+Ts, Tp=Tp1+Tp2, and Ts=Ts1+Ts2 hold also in the present embodiment. Herein, Ts and Tp represent the processing time of the DF shading correction and the preparation time for the DF shading correction, respectively. Further, Ts1 and Ts2 represent the time from the start of the carriage movement to the start of the reading operation for shading correction, and the time from the start of the reading operation for shading correction to the completion of shading correction, respectively. Further, Tp1 and Tp2 represent the preparation time for the reading operation for shading correction and the preparation time for the setting of a carriage driving operation, respectively.

Unlike the background example, however, the instruction to start the carriage operation precedes the setting of the reading operation for shading correction in the present embodiment. Further, the present embodiment performs the setting of the reading operation for shading correction during the time from the start of the carriage operation to the start of the reading operation for shading correction. Thereby, the carriage operation and the setting of the reading operation for shading correction are performed in parallel. Accordingly, it is possible to reduce the processing time necessary for the entire shading correction.

That is, as illustrated in FIG. 7, in a system in which the time Ts1 is longer than the time Tp1, the carriage operation and the setting of the reading operation for shading correction can be performed in parallel. Further, in this case, the time TD for the pre-reading DF shading correction is represented as TD=Tp2+Ts. Accordingly, the processing time of the entire shading correction is reduced by the time Tp1.

Figure 8:
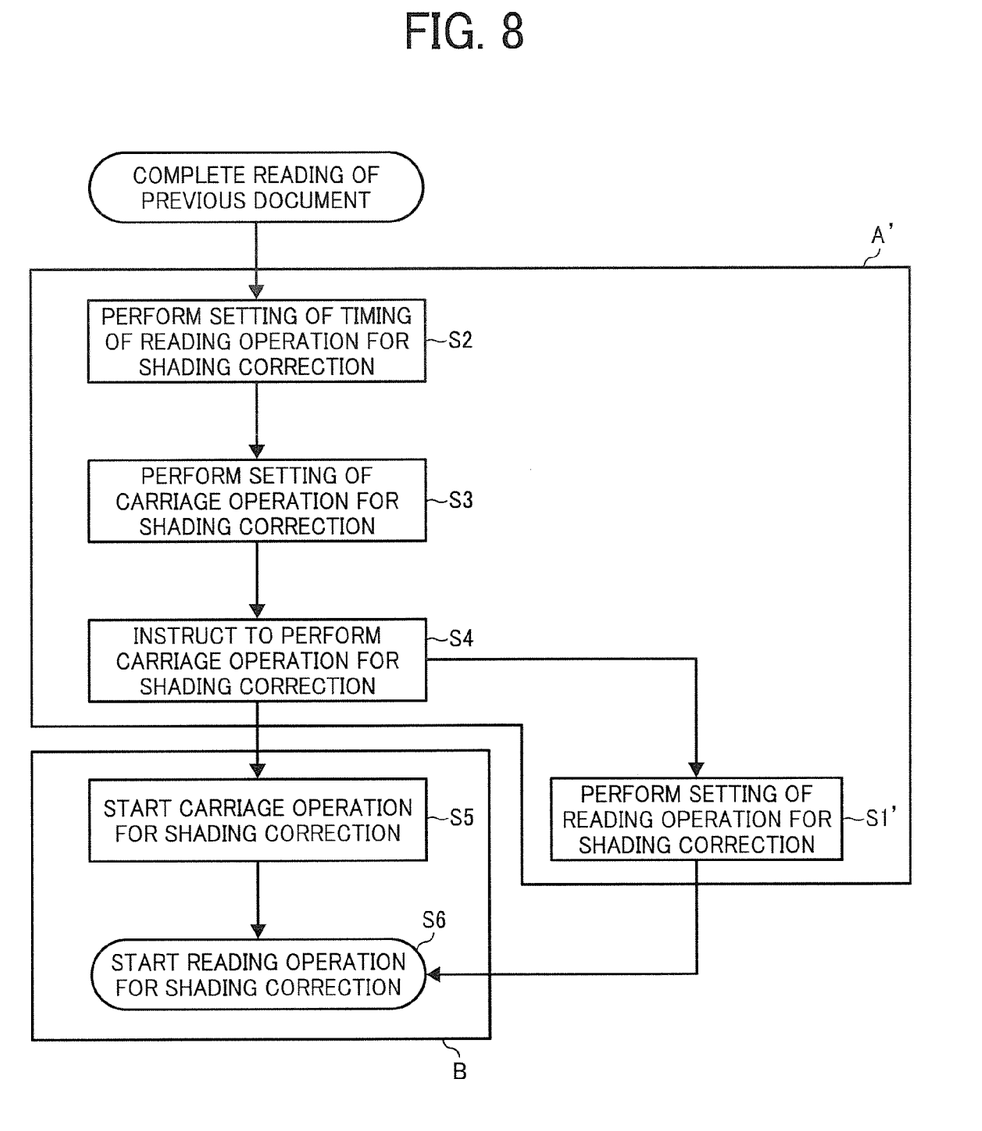
FIG. 8 is a flowchart illustrating a processing procedure performed in the pre-reading DF shading correction according to the present embodiment.

FIG. 8 is a flowchart illustrating a processing procedure performed in the present example. In the flowchart, upon completion of the reading operation of a previous document, the setting of the timing of the reading operation for shading correction (Step S2) and the setting of the carriage operation for shading correction (Step S3) are performed. Then, an instruction to perform the carriage operation for shading correction is issued (Step S4). On the basis of the instruction, the carriage operation for shading correction is started (Step S5), and the setting of the reading operation for shading correction is performed (Step S1'). Then, the reading operation for shading correction is started with the settings determined at Step S1' (Step S6). In the processing procedure illustrated in the flowchart, the setting of the reading operation for shading correction, i.e., the process of Step S1 of the background example illustrated in FIG. 3 is performed after the issuance of the instruction to perform the carriage operation for shading correction (Step S4). The above-described process is represented as Step S1' in FIG. 8, but is similar to the process of Step S1 in FIG. 3.

Figure 9:
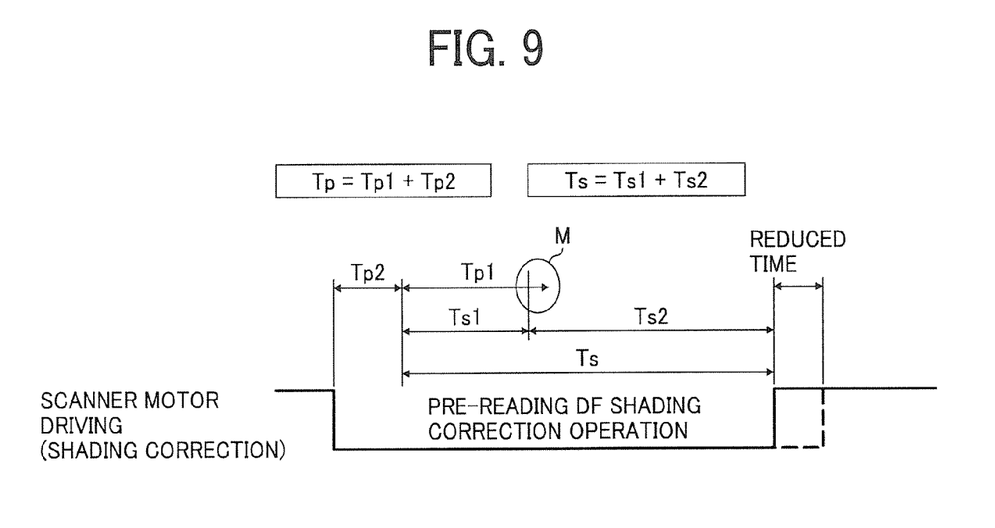
FIG. 9 is a timing chart illustrating timing according to which the setting of shading correction fails in the DF shading correction illustrated in FIG. 7.

Meanwhile, there is a case in which the time Tp1 exceeds the time Ts1 for various reasons. In this case, the reading operation starts before the setting of the reading operation for shading correction is completed, as indicated by a circle M in FIG. 9. As a result, operational inconsistency occurs. As one of the reasons for the time Tp1 exceeding the time Ts1, it is conceivable that a delay in software processing causes the time Tp1 to exceed an expected time.

Figure 10:
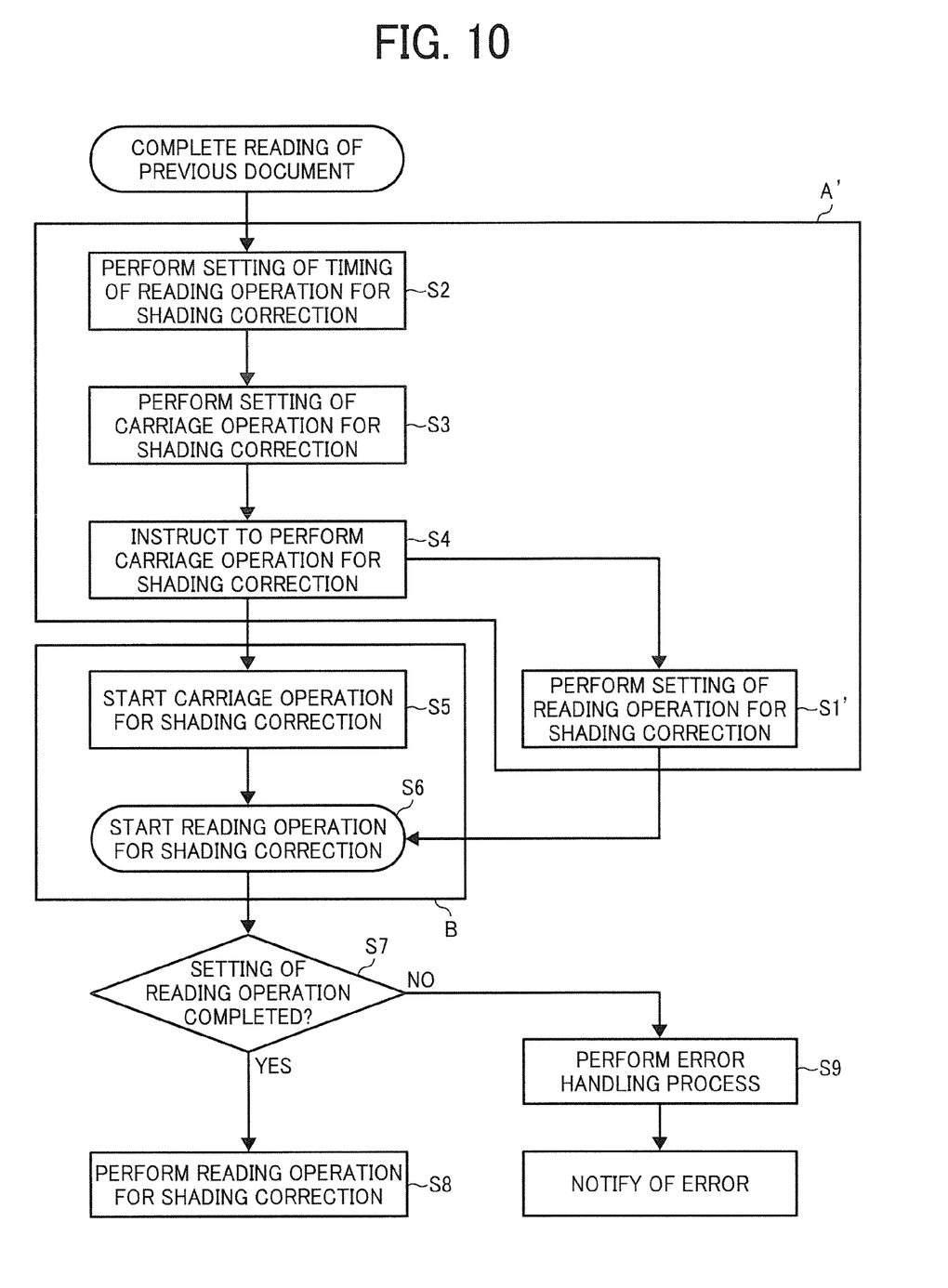
FIG. 10 is a flowchart illustrating a processing procedure performed when the preparation for the reading operation for shading correction is not in time for shading correction.

FIG. 10 is a flowchart illustrating a processing procedure performed when time Tp1 exceeds the time Ts1. FIG. 10 is similar to FIG. 8 in shading correction setting process A' and shading correction B. Upon start of the reading operation for shading correction at Step S6 of shading correction B, whether or not the setting of the reading operation for shading correction (Step S1') has been completed is determined (Step S7). Then, if the setting of the reading operation for shading correction has been completed (YES at Step S7), the reading operation for shading correction is performed (Step S8). Meanwhile, if the setting of the reading operation for shading correction has not been completed (NO at Step S7), an error handling process is performed (Step S9), and the error is notified to a user (Step S10).

The start of the reading operation for shading correction at Step S6 is detected with the use of a software interrupt signal emitted when a reading control signal is generated, for example.

Further, the error handling process at Step S9 includes: a process of interrupting the reading operation of the next document upon detection of the error; a process of storing a value obtained by the previous shading correction as a correction parameter obtainable by shading correction, and using the thus stored value; and a process of storing a preset correction parameter by using a storage control device, and using the thus stored value of the preset correction parameter, for example.

Figure 11:
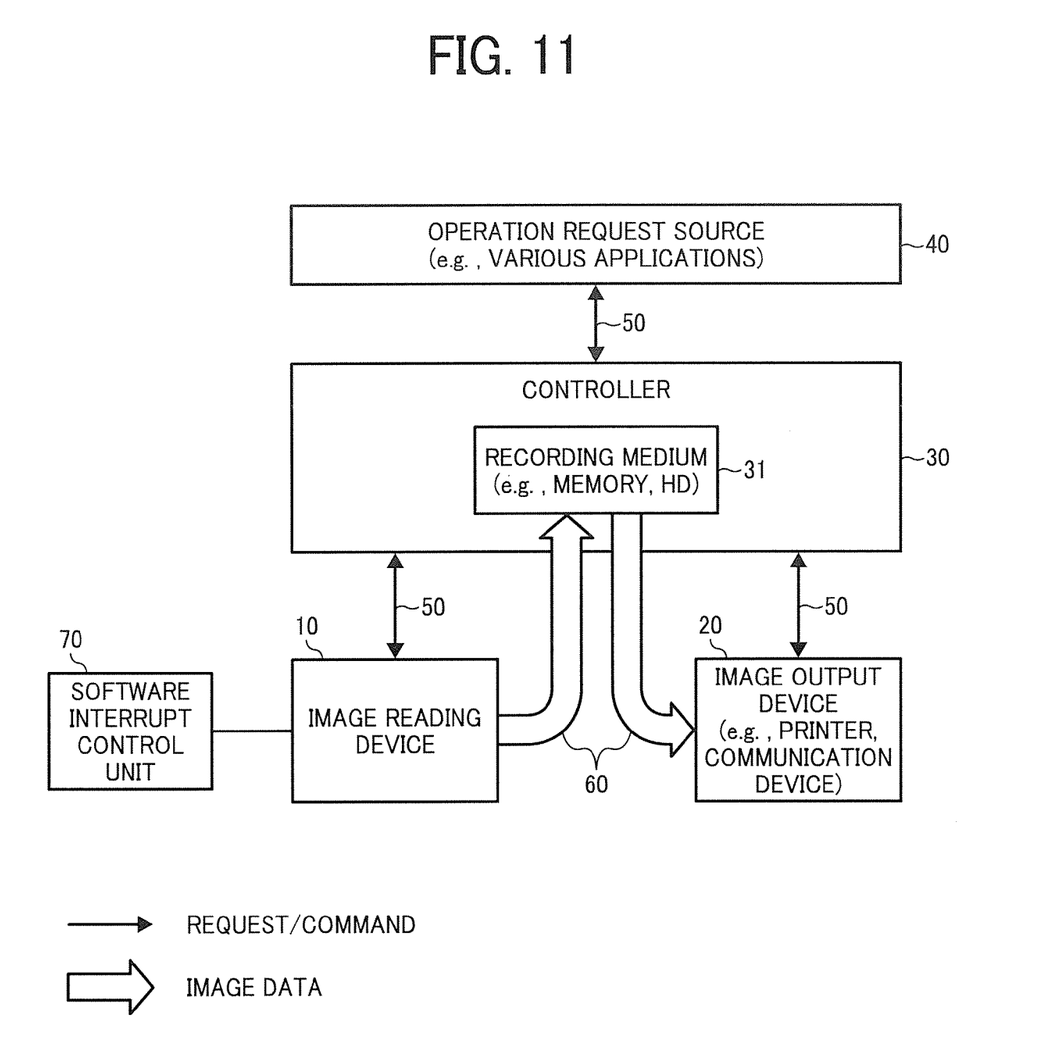
FIG. 11 is a diagram illustrating a configuration of a system in which the system configuration of FIG. 4 is provided with a software interrupt control unit.

To detect the start of the reading operation for shading correction by using the software interrupt signal emitted when the reading control signal is generated, a software interrupt control unit 70 may be provided at the previous stage of the image reading device 10, as illustrated in FIG. 11. In this configuration, the start of the reading operation for shading correction is detected on the basis of a control signal emitted by the software interrupt control unit 70.

Figure 12:
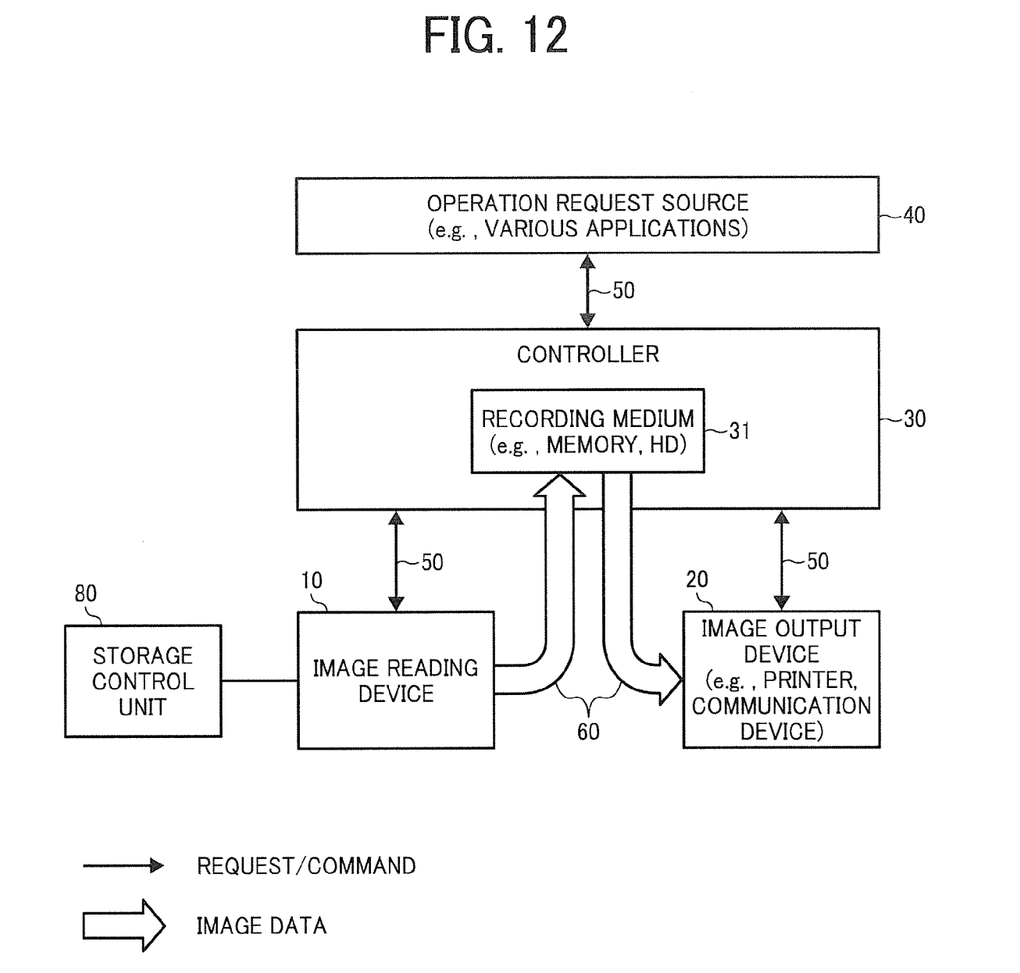
FIG. 12 is a diagram illustrating a configuration of a system in which the system configuration of FIG. 4 is provided with a storage control unit.

Further, as illustrated in FIG. 12, a storage control unit 80 may be provided at the previous stage of the image reading device 10 as the storage control device for storing the correction parameter obtained by the previous shading correction or the preset correction parameter. The storage control unit 80 uses, as a storage device, a volatile memory such as a RAM (Random Access Memory) and a non-volatile storage device such as an HDD (Hard Disk Drive). On the basis of a control signal emitted by the storage control unit 80, the correction parameter is read from the storage device, and shading correction is performed with the use of the thus read value of the correction parameter.

The respective processes described in the above-described flowcharts are performed by the controller 30. That is, a program code stored in a not illustrated and separately provided ROM (Read-Only Memory) is expanded in a not illustrated RAM by the controller 30. The controller 30 uses the RAM also as a storage device for storing data necessary for the processes, and performs a variety of control operations including the processes illustrated in the respective flowcharts on the basis of a program written in the thus expanded program code.

As described above, the present embodiment is configured as follows.

In shading correction of the images on successively fed sheets, the embodiment first performs the setting of the timing of starting shading correction and the setting of the carriage operation (Steps S2 and S3 corresponding to the time Tp2). Then, the embodiment performs the setting of shading correction (Step S1' corresponding to the time Tp1) before shading correction starts (Step S6 corresponding to the time Ts2) during the carriage operation. Therefore, the parallel operations are performed during the time Tp1. Accordingly, the time necessary for the entire shading correction can be reduced.

Further, if the setting of shading correction is not completed within the time from the start of the carriage operation to the start of shading correction (i.e., the time Ts1), i.e., if the time Tp1 exceeds the time Ts1, the embodiment detects an error and notifies the user of the error. Therefore, the embodiment can handle the error which may occur in the above-described configuration for reducing the processing time. Accordingly, the reliability of the operation can be ensured.

Further, if the setting of shading correction is not completed within the time from the start of the carriage operation to the start of shading correction (i.e., the time Ts1), i.e., if the time Tp1 exceeds the time Ts1, the embodiment detects an error. Further, in response to the error which may occur in the above-described configuration for reducing the processing time, the embodiment omits the ongoing shading correction and performs shading correction by using the preset shading correction parameter. Accordingly, the productivity of the reading operation can be ensured in the event of an error.

Further, if the setting of shading correction is not completed within the time from the start of the carriage operation to the start of shading correction (i.e., the time Ts1), i.e., if the time Tp1 exceeds the time Ts1, the embodiment detects an error. Further, in response to the error which may occur in the above-described configuration for reducing the processing time, the embodiment omits the ongoing shading correction and performs shading correction by referring to shading correction data of the previous reading operation. Accordingly, the productivity of the reading operation can be ensured in the event of an error.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape, are not limited the embodiments and thus may be preferably set. It is therefore to be understood that within the scope of the appended claims, the disclosure of this patent specification may be practiced otherwise than as specifically described herein.

The invention claimed is:

1. An image reading device that reads an image using a sheet-through method, the image reading device comprising:
a reading device that includes a carriage including an optical device for optically reading an image; and a control device to control shading correction of images on successively fed sheets,
the control device first setting a timing of a start of shading correction and setting operation of the carriage, and then setting shading correction prior to a start of shading correction during the operation of the carriage.

2. The image reading device as described in claim 1, wherein the control device detects an error and notifies a user of the error whenever the control device fails to complete the setting of the shading correction within a time period extending from a start of the operation of the carriage to the start of shading correction.

3. The image reading device as described in claim 1, wherein the control device omits the ongoing shading correction and causes shading correction to be performed with the use of a preset shading correction parameter whenever the control device fails to complete the setting of shading correction within a time period extending from a start of the operation of the carriage to the start of shading correction.

4. The image reading device as described in claim 1, wherein the control device omits the ongoing shading correction and causes shading correction to be performed with reference to shading correction data of a previous reading operation whenever the control device fails to complete the setting of shading correction within a time period extending from a start of the operation of the carriage to the start of shading correction.

5. The image reading device as described in claim 4, further comprising:
a storage device to store shading correction data of the previous reading operation.

6. An image forming apparatus including the image reading device according to claim 1.

7. The image forming apparatus according to claim 6, wherein, if the setting of shading correction is not completed within a time from a start of the operation of the carriage to the start of shading correction, the control device detects an error and notifies a user of the error.

8. The image forming apparatus according to claim 6, wherein, if the setting of shading correction is not completed within a time from a start of the operation of the carriage to the start of shading correction, the control device omits the ongoing shading correction and causes shading correction to be performed with the use of a preset shading correction parameter.

9. The image forming apparatus according to claim 6, wherein, if the setting of shading correction is not completed within a time from a start of the operation of the carriage to the start of shading correction, the control device omits the ongoing shading correction and causes shading correction to be performed with reference to shading correction data of a previous reading operation.

10. The image forming apparatus according to claim 9, wherein the image reading device further comprises: a storage device configured to store shading correction data of the previous reading operation.

11. An image reading method of reading an image using a sheet-through method, the image reading method comprising:
optically reading an image by operating a carriage including an optical device; and
performing shading correction of images on successively fed sheets,
the performing shading correction including:
setting a timing of a start of shading correction;
setting operation of the carriage for shading correction;
setting shading correction; and
performing shading correction during the operation of the carriage for shading correction.

* * * * *